United States Patent [19]

Brammer

[11] Patent Number: 4,702,481
[45] Date of Patent: Oct. 27, 1987

[54] WELLHEAD PACK-OFF WITH UNDULATED METALLIC SEAL RING SECTION

[75] Inventor: Norman Brammer, Ventura, Calif.

[73] Assignee: Vetco Gray Inc, Houston, Tex.

[21] Appl. No.: 891,705

[22] Filed: Jul. 31, 1986

[51] Int. Cl.[4] ............................................. F16J 15/12
[52] U.S. Cl. ................................ 277/116.2; 277/166; 277/180; 277/213
[58] Field of Search ................... 277/116.2, 166, 180, 277/207 R, 213, 228

[56] References Cited

U.S. PATENT DOCUMENTS

| 250,929 | 12/1881 | Lewis | 277/213 |
|---|---|---|---|
| 1,889,869 | 12/1932 | Montgomery | 277/213 |
| 2,303,090 | 11/1942 | Pranger et al. | 277/213 |
| 3,930,656 | 1/1976 | Jelinek | 277/180 |
| 4,196,913 | 4/1980 | Oka | 277/166 |

Primary Examiner—Robert S. Ward
Attorney, Agent, or Firm—Joseph R. Dwyer

[57] ABSTRACT

A pack-off (10) comprising of two metallic rings (12, 14) with a serpentine or undulating band (16) integral therewith embedded in elastomeric material (32). The lower metallic ring (14) is narrower than the upper metallic ring (12) and the serpentine band (16) and elastomeric material taper such that the narrow portion is at the lower end of the pack-off to engage and seal a tapered annulus (40) in a wellhead system. In one embodiment, the apices (20–26) of the serpentine band are curved and engage the side walls of a tapered annulus (40) to provide a combined metal-to-metal and elastomeric seal. In another embodiment, the apices (20a–26a) of the serpentine band are flat to provide more metal contact with the side walls of the tapered annulus (10). The lower ring engages an abutment (52) and continued movement of the pack-off (10) deforms the band (16) and expands the elastomeric material (34) to seal the annulus (40). The abutment (52), the taper of the pack-off (10), and taper of the annulus (40) facilitates sealing and retrieval of the pack-off (10) if the latter becomes necessary.

12 Claims, 4 Drawing Figures

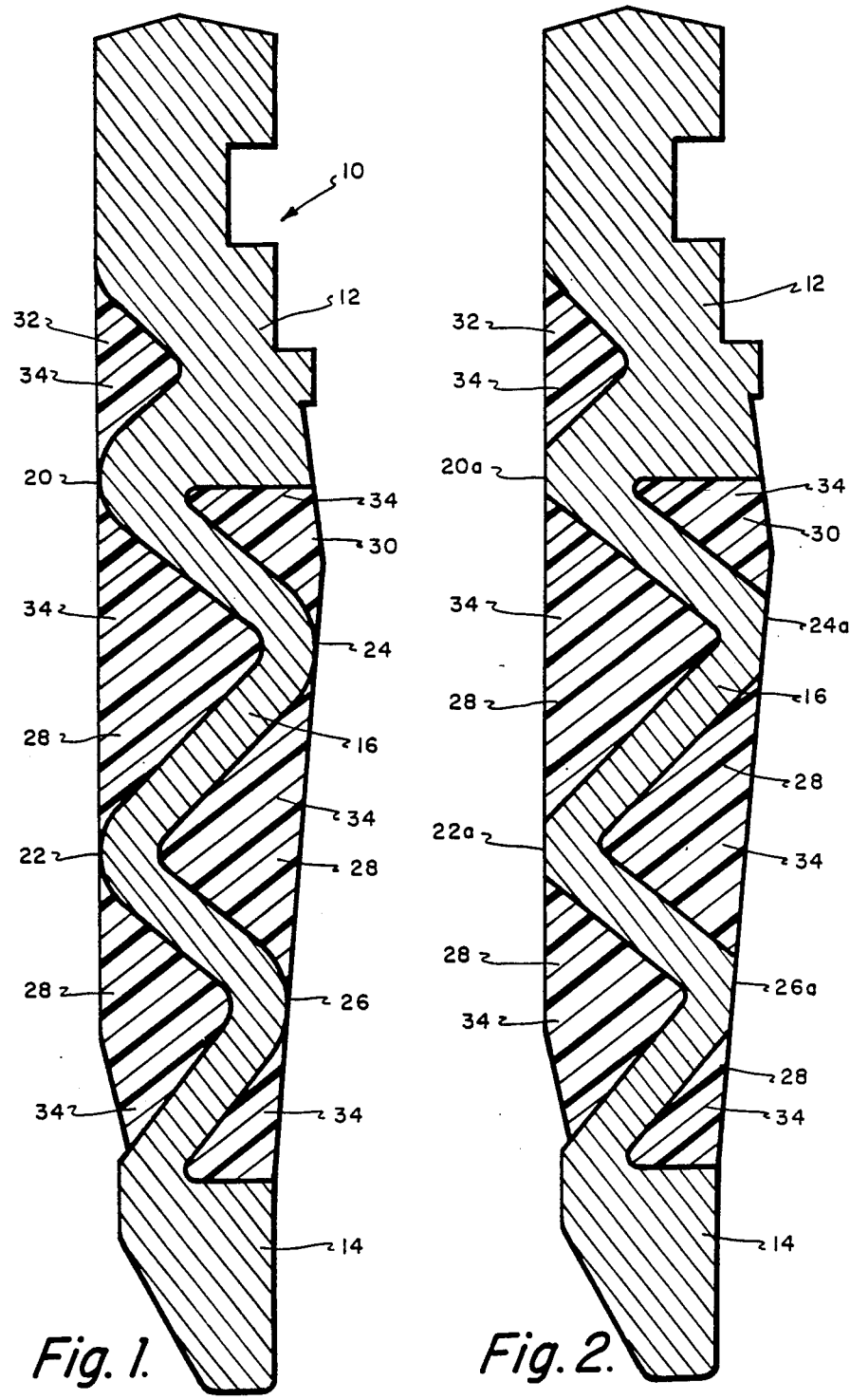

WELLHEAD PACK-OFF WITH UNDULATED METALLIC SEAL RING SECTION

BACKGROUND OF THE INVENTION

This invention relates to wellhead systems and is specifically directed to seal assemblies, often referred to as pack-off assemblies, for sealing the annular space, referred to as an annulus or gland, between a wellhead casing hanger and the surrounding cylindrical wall of a wellhead.

This invention is specifically directed to a new and improved pack-off for such pack-off assemblies.

The U.S. Pat. No. 3,468,558 which issued as early as 1969, and later patents such as U.S. Pat. No. 3,871,449, explain the operation and purpose of pack-off assemblies as well as the various ways of running and setting the pack-off, i.e., sealing the annulus.

These patents also show different types of pack-offs for these pack-off assemblies and more recently the U.S. Pat. Nos. 3,797,864 of Hines and Ortolon and 4,521,040 of Slyker and Pettit illustrate more recent pack-offs. These latter patents show a pack-off comprising an elastomeric ring interposed between two metallic seal rings with each metallic seal ring having a pair of lips extending toward the elastomeric material which form a seal of elastomeric material and metal when the pack-off is set.

Attention is also directed to the U.S. Pat. No. 4,324,422 of Rains and Reimert in which a pair of metallic rings with dog-like overlapping fingers were embedded in elastomeric material and arranged in a lost motion connection between the fingers. The lost motion connection allowed deformation of the elastomeric material when the pack-off was set and provided the pack-off with retrievable characteristics.

Still another pack-off which is part of the prior art is one utilizing upper and lower metallic rings with a deformable metallic band therebetween and surrounded by a plurality of elastomeric rings. The deformable metallic band is in the form of a plurality of V's laid sidewards having the elastomeric rings at the apex of the V's. When set, the end of the legs and apices of the V's, together with the elastomeric rings, engage the sidewalls of the annulus to form a seal. This type of seal needs a high amount of force to set and was also known to be used in a cylindrical annulus without an abutment to assist in expanding the metallic band and elastomeric rings. Retrieval of the pack-off was virtually impossible and the pack-off was usually destroyed when retrieval was attempted.

Another pack-off having retrievable characteristics is that shown in the U.S. Pat. No. 3,561,527 of Nelson which has a centrally located vertically oriented serpentine shaped band embedded in elastomeric material. The size and thickness of the serpentine band, like the pack-off of the U.S. Pat. No. 4,324,422 of Rains and Reimert, supra, interfered with the deformation characteristics of the elastomeric material and reduced the sealing capabilities of the pack-off.

It is therefore an object of this invention to provide a pack-off with metallic ring seals together with a serpentine band integral therewith with elastomeric material imposed therebetween and which is tapered to interface with a tapered annulus in a wellhead system.

The Related Applications, supra, discloses a wellhead system with a tapered annulus, and an abutment against which the tapered pack-off engages to expand and compress the pack-off for sealing the annulus. These applications also show various means for shifting the pack-off into the annulus. It will be apparent to those skilled in the art that the pack-off of this invention is capable of being used in the wellhead systems of these applications as well as any other wellhead system which has a tapered annulus and an abutment with any means for shifting the pack-off into the annulus such as those shown in any of the prior art patents, supra.

SUMMARY OF THE INVENTION

The pack-off and pack-off assembly of this invention which obtains the foregoing object comprises a pack-off with two metallic seal rings with a serpentine band integral therewith embedded in the elastomeric material. The lower metallic ring is narrower than the upper metallic ring and the undulating band and elastomeric material taper such that the narrow portion is at the lower end of the pack-off to engage and seal a tapered annulus.

In one embodiment, the apices of the serpentine band are curved and engage the side walls of a tapered annulus to provide a combined metal-to-metal and elastomeric seal. In another embodiment, the apices of the serpentine band are flat to provide more metal contact with the side walls of the tapered annulus. The lower ring engages an abutment when moved into the annulus and continued movement of the pack-off deforms the serpentine ring and expands the elastomeric material to seal the annulus. The abutment, the taper of the pack-off, and taper of the annulus facilitate sealing and retrieval of the pack-off if the latter becomes necessary.

BRIEF DESCRIPTION OF THE DRAWINGS

FIG. 1 is a cross-sectional view in elevation of one embodiment of the pack-off of this invention showing the details of construction thereof, FIG. 2 is a cross-sectional view similar to FIG. 1 but showing another embodiment of the pack-off of the invention with flat apices.

DETAILED DESCRIPTION

Figure 3:
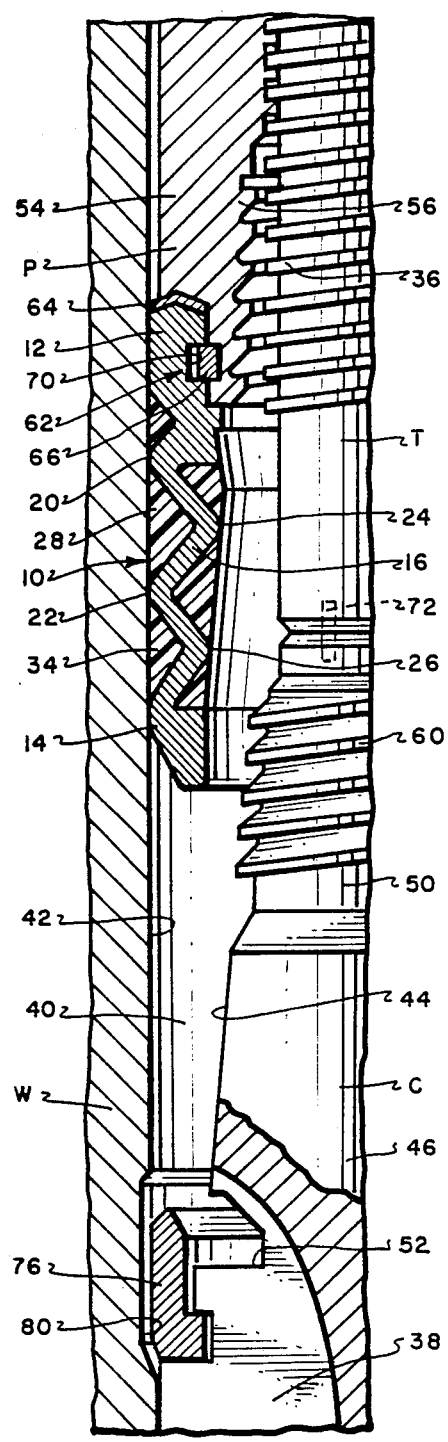
FIG. 3 is a partial cross-sectional elevational view of a wellhead system illustrating a pack-off seal assembly having the first embodiment of the tapered pack-off of this invention located above the tapered annulus.

FIG. 1 illustrates the first embodiment of a pack-off 10 constructed in accordance with this invention and shown to comprise an upper metallic cylindrical support ring 12, also called a seal ring, a lower metallic cylindrical abutment ring 14, also called a seal ring, integrally connected together by a longitudinally undulated or serpentine metallic seal ring section or band 16. The undulations of the waved metallic seal ring section 16 form a plurality of essentially triangles with apices as viewed in cross section (four shown); two apices 20 and 22 on the outside of the pack-off and two inwardly facing crests with apices 24 and 26. The apices 20 and 22 are vertically aligned to engage a cylindrical bore wall while apices 24 and 26 are on a tapered or slanted line to engage a tapered wall. Thus, the legs of the triangles become shorter near the abutment ring 14. The difference in the length of the legs of the triangles is determined by the taper of the pack-off 10. The spacing 28 within the triangles and the triangles 30 and 32 are formed in support ring 12 are filled with a suitable elastomeric material 34 leaving the apices 20–26 exposed. Thus, a combined elastomeric and metal-to-metal type pack-off is defined and is tapered from the wider top support ring to the narrower abutment ring. Both the serpentine ring section and the elastomeric material will be deflected to seal the annulus of a well system.

The pack-off illustrated in FIG. 2 is essentially the same as that shown in FIG. 1 except that the apices are flat and the apices are thus given the reference numeral 20–26 with suffix "a" to illustrate the only difference in the two pack-offs. The flat apices 20a–26a provide more metal area for the metal-to-metal seal aspect of this embodiment. All other components are the same and function the same as described in connection with FIG. 1 and are thus given the same reference numeral to simplify the description.

Figure 4:
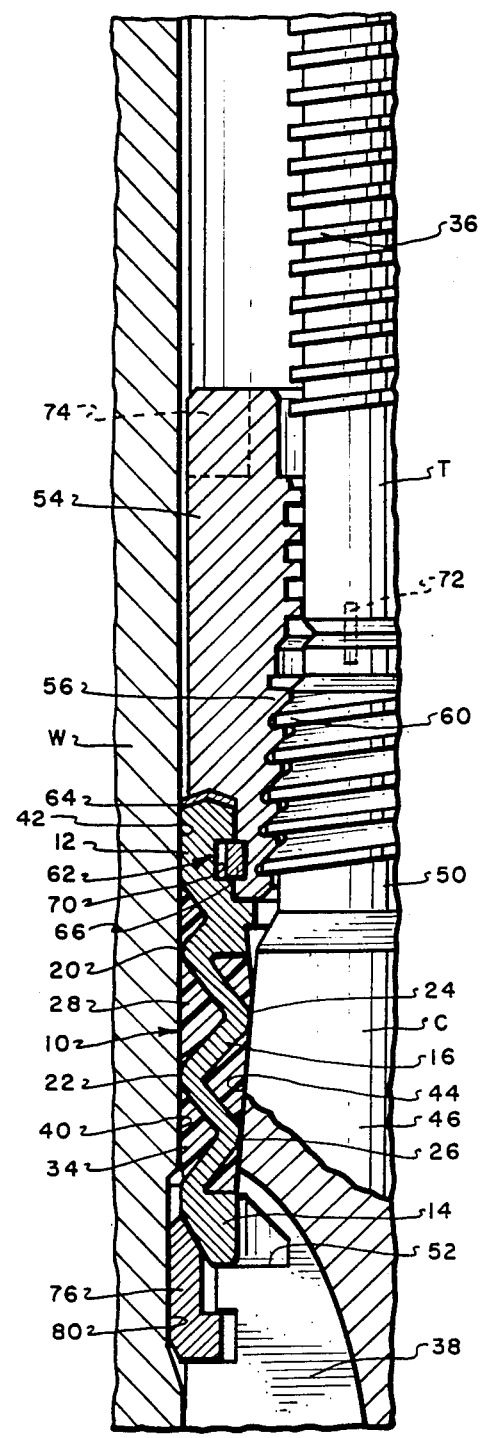
FIG. 4 is a view similar to FIG. 3 but showing the pack-off drive nut threaded onto mating threads on the casing hanger and the pack-off energized and set in the tapered annulus, thus sealing the latter.

FIGS. 3 and 4 illustrate an arrangement within the wellhead housing W (outer tubular member) with a casing hanger C (inner tubular member) supported on a profile (not shown).

Thus, the drawings depict the pack-off assembly P already landed in a well housing W. The casing hanger C and pack-off assembly P were made up while on the vessel or platform and lowered to the wellhead housing W on a running tool T which is conventionally connected to one end of a string of tubing, such as drill pipe. Whether or not the casing hanger C and the pack-off assembly P are lowered together or two trips to the wellhead are required, one for setting the casing hanger C and the other to lower the pack-off assembly P and perhaps a wear bushing, is not material to this invention. Also, the pack-off assembly P and running tool T are shown connected together in FIG. 2 for running by mating square threads 36 which are shown only as one way in which the two may be connected.

In the position shown in FIG. 3, circulating and cementing operations can be conducted in the usual manner through circulating passages 38 and through the space or annulus 40 between the cylindrical outer wall or bore 42 of the wellhead housing W and opposing wall 44 of the casing hanger. After completion of the cementing operations the annulus 40 is sealed off by the pack-off assembly 10.

The depicted casing hanger C comprises a main body section 46 integral with an upper section 50 and provided with a cylindrical inner bore, the circulating passages 38 and pack-off actuating shoulder 52 (abutment). Not shown are threads on the lower end of the casing hanger to support the threaded casing in the wall in the conventional and known manner.

See by way of example the U.S. Pat. Nos. 3,468,558, 3,871,449, 3,492,026 and 3,797,864.

The pack-off assembly P typically includes the pack-off 10 and a pack-off drive nut 54 which supports the pack-off 10. The pack-off drive nut 54, in addition to threads 56 for engaging mating external threads on the running tool T, has tapered internal threads 56 for engaging external threads 60 on the upper end of the casing hanger C such that rotation of the pack-off drive nut 54 will first thread the pack-off drive nut 54 off the running tool T and then onto the tapered threads 60 so that rotation of the pack-off drive nut 54 will thread the pack-off assembly P downward into the annulus 40. Due to the taper of the running nut 54 and casing hanger C in the area of the threads 56 and 60, respectively, the threads will overlap before mating and full makeup of the threads will require only a fraction of a turn of the pack-off nut 54.

To allow the pack-off drive nut 54 to rotate without rotation of the pack-off 10, the pack-off assembly P has a swivel connection 62 and a thrust bearing area 64. The swivel connection 62 comprises a split retainer ring 66 mounted in complementary grooves 70 in the pack-off nut 54 and upper support ring 12. Also suitable means, such as pins 72 (one shown in phantom), inhibit relative rotation between the casing hanger C and the running tool T. Suitable means, such as a sleeve (not shown) with lugs, rotatable on the running tool T, engaging slots 74 (only one shown in phantom in FIG. 4) are used to rotate the pack-off drive nut 54.

Threads 56 and 60 on the drive nut 54 and casing hanger C, respectively, are multi-start threads as shown and described in the European Application No. 8401875.4 of Philippe C. Nobileau. This Application was published May 2, 1985 (Publication No. 0 139 565) and in this European application the threads are illustrated on a pin and box connector. As explained in this European application, after stabbing the pin and box, full makeup of the pin and box threads is accomplished by rotation of a fraction of a turn (with the entire length of the threads fully engaged over the entire periphery of their interlocking surfaces since each thread extends over more than one turn). The amount of rotation required depends inversely on the number of thread starts. Since the amount of travel to set the pack-off may vary, the number of thread starts may be selected accordingly.

FIG. 4 shows the pack-off 10 driven into the annulus 40 and the elastomeric material and apices of the serpentine ring section 16 engaging the sidewalls to pressure seal the annulus with both elastomeric material and metal. As the pack-off is moved downward, the pack-off taper and the annulus taper cooperate to allow the pack-off to move relatively free of friction until the lower abutment ring 14 engages the shoulder 52 on the casing hanger C and also engages a split ring 76, which is held on the casing hanger C, urging the split ring into a groove 80 in the wellhead W in order to lock the casing hanger C in the wellhead W. The engagement of the lower abutment ring 14 against shoulder 52 and the continued rotation of the pack-off drive nut 54 deforms and compresses the serpentine seal ring section 16 and expands the elastomeric material sealing the annulus. At this time the pack-off is considered set.

In view of the taper of the pack-off and the annulus and as a consequence of the multi-start threads the pack-off is set in the annulus with only a partial turn of the pack-off drive nut 54. Similarly, the taper of the annulus and pack-off will allow the pack-off to be withdrawn in the event a seal is found to be leaky with less than one turn of the pack-off drive nut. Too, with the upper support ring 12 connected to the lower abutment ring 14 through the serpentine ring section 16, a pulling force on support ring 12 will be applied also to the lower support ring 14 to facilitate retrieval.

I claim:

1. A tapered pack-off for pressure sealing an annular tapered space formed between concentric cylindrical metal bodies of a subsea wellhead and a casing hanger when located subsea comprising;

an upper metallic seal ring,
a lower metallic seal ring, said lower metallic seal ring being narrower than said upper metallic seal ring and disposed relative to said upper metallic ring such that the radially outer extent of both rings are the same while the radially inner extent of the lower metallic ring is radially greater thanthe radial extent of said upper metallic ring, a serpentine undulating metallic band extending between said upper and lower metallic seal rings, and elastomeric material in the undulations of said serpentine band, together to provide both elastomeric and metal-to-metal sealing of said annular tapered space.

2. The pack-off as claimed in claim 1 wherein said serpentine metallic band is integral with said upper and lower metallic seal rings.

3. The pack-off as claimed in claim 2 wherein said serpentine undulating metallic band has curved apices at the tops of said undulations which are exposed to provide metal contact for metal-to-metal seal with said metal bodies forming said tapered annular space.

4. The pack-off as claimed in claim 3 further including means for engaging an abutment within said tapered annular space so that the distance between said upper and lower metallic seal rings is shortened thereby expanding said elastomeric material and deforming said serpentine undulating band.

5. The pack-off as claimed in claim 4 wherein said serpentine undulating metallic band has flat apices at the tops of said undulations which are exposed to provide large metal-to-metal contact for said metal-to-metal seal with the metallic bodies forming said tapered annular space.

6. The pack-off as claimed in claim 5 further including means for engaging an abutment within said annular space so that the distance between said upper and lower metallic seal rings is shortened thereby expanding said elastomeric material and deforming said serpentine undulating band.

7. A pack-off assembly for sealing annular tapered space which is narrower at the bottom than at the top between concentric pressure-containing metallic bodies, such as a subsea wellhead and a casing hanger, one of said bodies having an abutment, comprising:

an upper metallic metal seal ring, a lower metallic seal ring which is narrower than the upper metallic seal ring to conform to the taper of said tapered annular space, means in the form of an undulating metallic band between said upper and lower metallic seal rings, elastomeric material between the undulations of said metallic band, both said undulations and said elastomeric material conforming to the taper of said tapered annular space, and compression means for compressing said pack-off downwardly against said abutment and causing movement of said upper and lower rings toward each other to distort said undulating band and deform said elastomeric material to seal said tapered annular space by engaging said metallic bodies where said tapered annular space is formed.

8. The pack-off assembly as claimed in claim 7 wherein said serpentine metallic band is integral with said upper and lower metallic seal rings.

9. The pack-off assembly as claimed in claim 7 wherein said undulating metallic band has curved apices at the tops of said undulations which are exposed to provide metal contact for said metal-to-metal seal with said metallic bodies defining said tapered annular space.

10. The pack-off assembly as claimed in claim 9 further including means for engaging an abutment within said annular space for expanding said elastomeric material and deforming said undulating band.

11. The pack-off assembly as claimed in claim 7 wherein said undulating metallic band has flat apices at the tops of said undulations which provide large metal-to-metal contact for said metal-to-metal seal with said metallic bodies forming said tapered annular space.

12. The pack-off assembly as claimed in claim 11 further including means for engaging an abutment within said annular space for expanding said elastomeric material and deforming said undulating band.

* * * * *